(12) United States Patent
Choi et al.

(10) Patent No.: US 9,819,790 B2
(45) Date of Patent: *Nov. 14, 2017

(54) INFORMATION PROVIDING APPARATUS AND METHOD THEREOF

(71) Applicant: LG ELECTRONICS INC., Seoul (KR)

(72) Inventors: Sungha Choi, Seoul (KR); Minhun Lee, Seoul (KR); Seyoung Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 15/341,869

(22) Filed: Nov. 2, 2016

(65) Prior Publication Data

US 2017/0078476 A1    Mar. 16, 2017

Related U.S. Application Data

(63) Continuation of application No. 14/901,933, filed as application No. PCT/KR2015/012009 on Nov. 9, 2015, now Pat. No. 9,596,355.

(30) Foreign Application Priority Data

Nov. 12, 2014    (KR) .......................... 10-2014-0157352

(51) Int. Cl.
  *H04M 3/00*    (2006.01)
  *H04M 1/725*    (2006.01)
  (Continued)

(52) U.S. Cl.
  CPC ........ *H04M 1/72583* (2013.01); *H04H 20/38* (2013.01); *H04L 67/306* (2013.01);
  (Continued)

(58) Field of Classification Search
  CPC ........... H04M 1/72583; H04M 11/007; H04W 84/18; H04W 4/008; H04W 4/046;
  (Continued)

(56) References Cited

U.S. PATENT DOCUMENTS 6,553,296 B2    4/2003 Breed et al.
8,255,154 B2    8/2012 Zilka
(Continued)

FOREIGN PATENT DOCUMENTS

JP    2005-269035 A    9/2005
KR    10-2005-0043353 A    5/2005
(Continued)

OTHER PUBLICATIONS

U.S. Appl. No. 14/901,933, filed Dec. 29, 2015.

*Primary Examiner* — Khai M Nguyen
(74) *Attorney, Agent, or Firm* — Birch, Stewart, Kolasch & Birch, LLP

(57) ABSTRACT

An information providing apparatus including: a communication unit to form a communication network with at least one of a plurality of mobile terminals within a vehicle; a display; and a controller to receive seat position information of the at least one of the plurality of mobile terminals through the communication network, activate or deactivate application programs for the at least one of the plurality of mobile terminals based on the seat position information, and display information indicating the activated or deactivated application programs of the at least one of the plurality of mobile terminals on the display.

20 Claims, 10 Drawing Sheets

|  | CALL | SMS | MUSIC | • • • | HVAC |
|---|---|---|---|---|---|
| DRIVER'S DEVICE | ✓ | ✓ | ✓ | • • • | ☐ |
| FRONT PASSENGER'S DEVICE | ☐ | ☐ | ✓ | • • • | ✓ |
| REAR PASSENGER'S DEVICE | ☐ | ☐ | ✓ | • • • | ✓ |

(51) Int. Cl.
   *H04W 84/18* (2009.01)
   *H04W 4/00* (2009.01)
   *H04W 4/04* (2009.01)
   *H04H 20/38* (2008.01)
   *H04L 29/08* (2006.01)
   *H04M 11/00* (2006.01)
   *H04W 52/02* (2009.01)

(52) U.S. Cl.
   CPC ......... *H04M 11/007* (2013.01); *H04W 4/008* (2013.01); *H04W 4/04* (2013.01); *H04W 4/046* (2013.01); *H04W 52/0261* (2013.01); *H04W 84/18* (2013.01); *Y02B 60/50* (2013.01)

(58) Field of Classification Search
   CPC .... H04W 4/04; H04W 52/0261; H04H 20/38; H04L 67/306; Y02B 60/50
   USPC ...................... 455/420, 419, 456.1
   See application file for complete search history.

(56) References Cited

U.S. PATENT DOCUMENTS

| | | |
|---|---|---|
| 2005/0039208 A1 | 2/2005 | Veeck et al. |
| 2009/0209296 A1 | 8/2009 | Kimura et al. |
| 2010/0131642 A1 | 5/2010 | Chalikouras et al. |
| 2012/0242474 A1 | 9/2012 | Oh et al. |
| 2013/0238167 A1* | 9/2013 | Stanfield .................. G08G 1/20 701/2 |
| 2014/0125355 A1 | 5/2014 | Grant |
| 2014/0297220 A1* | 10/2014 | Raffa ..................... B60N 2/002 702/150 |
| 2014/0306814 A1* | 10/2014 | Ricci ..................... H04W 48/04 340/425.5 |
| 2015/0341755 A1 | 11/2015 | Choi et al. |
| 2016/0042484 A1* | 2/2016 | Osann, Jr. ............... H04M 1/67 455/456.3 |
| 2016/0104328 A1* | 4/2016 | Chen ..................... G07C 5/0858 701/31.5 |
| 2016/0142877 A1* | 5/2016 | Gujral .................. H04W 4/046 455/456.1 |
| 2016/0192158 A1* | 6/2016 | Yamada ................ H04W 4/043 455/456.1 |
| 2016/0301808 A1* | 10/2016 | Choi ..................... H04H 20/38 |

FOREIGN PATENT DOCUMENTS

| | | |
|---|---|---|
| KR | 10-0667058 B1 | 1/2007 |
| KR | 10-2013-0070679 A | 6/2013 |
| KR | 10-2014-0103415 A | 8/2014 |

* cited by examiner

|  | CALL | SMS | MUSIC | · · · | HVAC |
|---|---|---|---|---|---|
| DRIVER'S DEVICE | ✓ | ✓ | ✓ | · · · | ☐ |
| FRONT PASSENGER'S DEVICE | ☐ | ☐ | ✓ | · · · | ✓ |
| REAR PASSENGER'S DEVICE | ☐ | ☐ | ✓ | · · · | ✓ |

INFORMATION PROVIDING APPARATUS AND METHOD THEREOF

CROSS REFERENCE TO RELATED APPLICATIONS

This application is a Continuation of U.S. application Ser. No. 14/901,933 filed Dec. 29, 2015, which is the National Phase of PCT International Application No. PCT/KR2015/012009, filed on Nov. 9, 2015, which claims priority under 35 U.S.C. 119(a) to Patent Application No. 10-2014-0157352, filed in the Republic of Korea on Nov. 12, 2014, all of which are hereby expressly incorporated by reference into the present application.

BACKGROUND OF THE INVENTION

Field of the Invention

The present disclosure relates to an information providing apparatus and a method thereof.

Discussion of the Related Art

In general, an information providing apparatus according to the related art may be applicable to various devices such as a mobile terminal, a notebook computer, a television set and the like, and provide various information such as television broadcast programs, voice information and the like to a user.

SUMMARY OF THE INVENTION

An information providing apparatus according to the embodiments of the present disclosure may include a communication unit configured to form a communication network with a plurality of mobile terminals within a vehicle; a display unit; and a controller configured to receive the seat position information of the plurality of mobile terminal through the communication network, and activate or deactivate application programs of the plurality of mobile terminals based on the seat position information, and display information indicating the activated or deactivated application programs of the plurality of mobile terminals on the display unit.

For an example associated with the present disclosure, the controller may display a vehicle image corresponding to the vehicle on the display unit, and display information indicating the activated or deactivated application programs on the vehicle image.

For an example associated with the present disclosure, the controller may display images corresponding to the plurality of mobile terminals at locations corresponding to the seat position information on the vehicle image, and display information indicating the activated or deactivated application programs on the images corresponding to the plurality of mobile terminals.

For an example associated with the present disclosure, the controller may detect user age groups corresponding to the plurality of mobile terminals, and activate or deactivate the application programs of the plurality of mobile terminals according to the detected user age groups.

For an example associated with the present disclosure, the controller may display information indicating the user age groups on information indicating the activated or deactivated application programs.

For an example associated with the present disclosure, the controller may display a menu for activating or deactivating the application programs of the plurality of mobile terminals, and activate or deactivate application programs selected by a user's input among the application programs contained in the menu.

For an example associated with the present disclosure, the menu may include a first application program list of a first mobile terminal within the vehicle; a second application program list of a second mobile terminal within the vehicle; and check boxes for selecting application programs within the first and the second application program list.

For an example associated with the present disclosure, the controller may activate or deactivate the application programs of the plurality of mobile terminals based on user preference information.

For an example associated with the present disclosure, the controller may set any one of the plurality of mobile terminals to a tethering terminal based on any one or more of network types, network data usages and network signal intensities of the plurality of mobile terminals.

For an example associated with the present disclosure, the controller may detect the network types, network data usages and network signal intensities of the plurality of mobile terminals in real time or periodically, and set any one of the plurality of mobile terminals to a tethering terminal according to the detected result.

For an example associated with the present disclosure, the controller may detect the battery remaining amounts of the plurality of mobile terminals, and form or block any one or more communication networks with the plurality of mobile terminal based on the detected remaining amounts of the batteries.

For an example associated with the present disclosure, the controller may detect the battery remaining amounts of the plurality of mobile terminals, and set any one of the plurality of mobile terminals to an information providing subject based on the detected remaining amounts of the batteries.

An information providing method according to the embodiments of the present disclosure may include forming a communication network with a plurality of mobile terminals within a vehicle; receiving the seat position information of the plurality of mobile terminal through the communication network, and activating or deactivating application programs of the plurality of mobile terminals based on the seat position information; and displaying information indicating the activated or deactivated application programs of the plurality of mobile terminals on the display unit.

DETAILED DESCRIPTION OF EMBODIMENTS OF THE INVENTION

Figure 1:
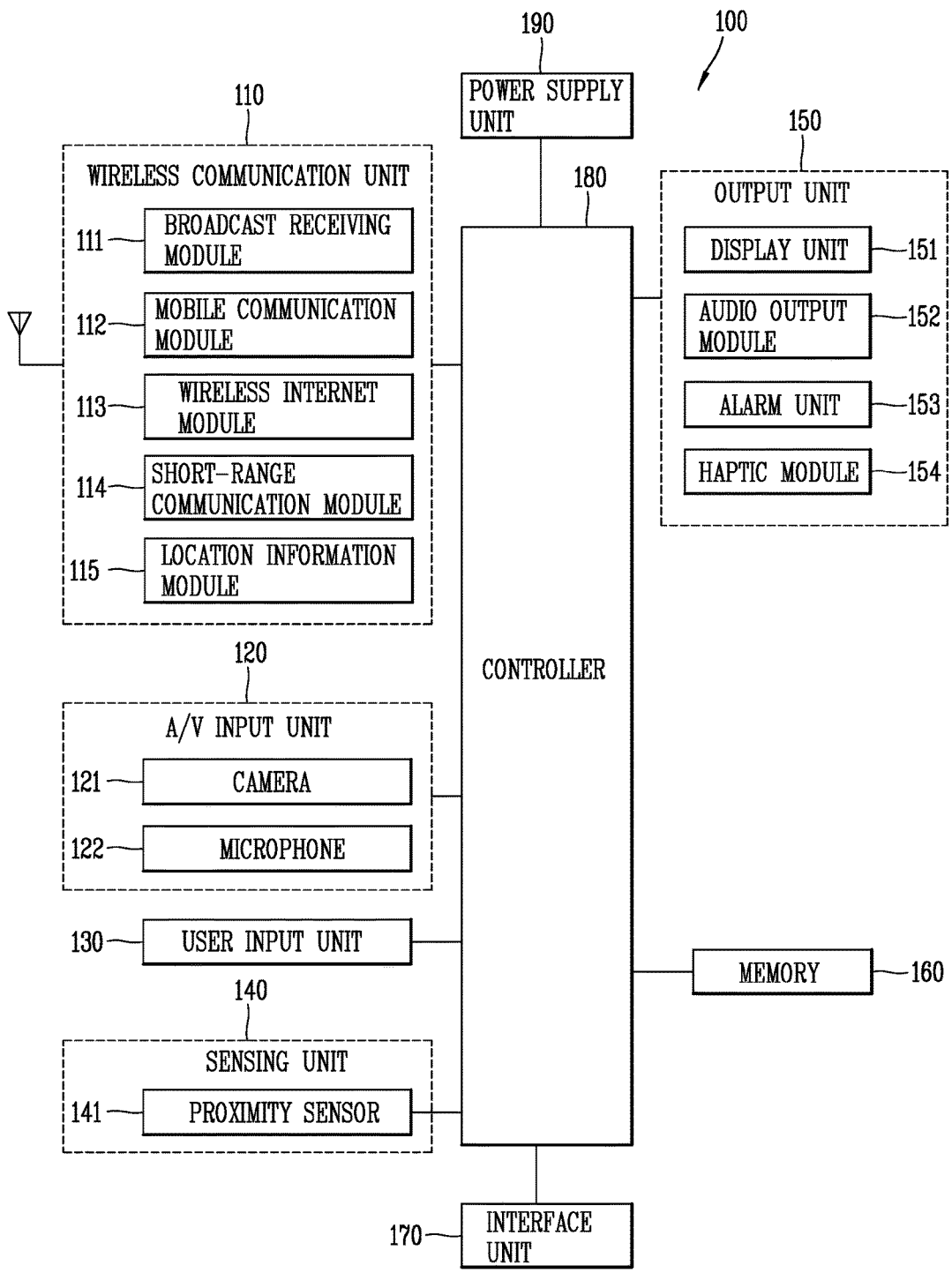
FIG. 1 is a block diagram illustrating the configuration of a mobile communication terminal for explaining the embodiments of the present disclosure.

It should be noted that technological terms used herein are merely used to describe a specific embodiment, but not to limit the present invention. Also, unless particularly defined otherwise, technological terms used herein should be construed as a meaning that is generally understood by those having ordinary skill in the art to which the invention pertains, and should not be construed too broadly or too narrowly. Furthermore, if technological terms used herein are wrong terms unable to correctly express the concept of the invention, then they should be replaced by technological terms that are properly understood by those skilled in the art. In addition, general terms used in this invention should be construed based on the definition of dictionary, or the context, and should not be construed too broadly or too narrowly.

Incidentally, unless clearly used otherwise, expressions in the singular number include a plural meaning. In this application, the terms "comprising" and "including" should not be construed to necessarily include all of the elements or steps disclosed herein, and should be construed not to include some of the elements or steps thereof, or should be construed to further include additional elements or steps.

Furthermore, in the present disclosure, the terms including an ordinal number such as first, second, etc. can be used to describe various elements, but the elements should not be limited by those terms. The terms are used merely for the purpose to distinguish an element from the other element. For example, a first element may be named to a second element, and similarly, a second element may be named to a first element without departing from the scope of right of the invention.

Hereinafter, preferred embodiments according to the present disclosure will be described in detail with reference to the accompanying drawings, and the same or similar elements are designated with the same numeral references regardless of the numerals in the drawings and their redundant description will be omitted.

In describing the present disclosure, moreover, the detailed description will be omitted when a specific description for publicly known technologies to which the invention pertains is judged to obscure the gist of the present invention. Also, it should be noted that the accompanying drawings are merely illustrated to easily explain the concept of the invention, and therefore, they should not be construed to limit the technological concept disclosed herein by the accompanying drawings.

FIG. 1 is a block diagram illustrating the configuration of a mobile communication terminal 100 for explaining embodiments of the present disclosure. The mobile communication terminal 100 may include a portable phone, a smart phone, a notebook computer, a digital broadcast terminal, a personal digital assistant (PDA), a portable multimedia player (PMP), and the like.

As illustrated in FIG. 1, the mobile communication terminal 100 may include a wireless communication unit 110, an A/V (Audio/Video) input unit 120, a user input unit 130, a sensing unit 140, an output unit 150, a memory 160, an interface unit 170, a controller 180, a power supply unit 190, and the like. All the elements of the mobile communication terminal 100, as illustrated in FIG. 1, are not necessarily required, and therefore, the mobile communication terminal 100 may be implemented with a larger or smaller number of elements than those as illustrated in FIG. 1.

The wireless communication unit 110 typically includes one or more elements allowing radio communication between the mobile communication terminal 100 and a wireless communication system, or allowing radio communication between the mobile communication terminal 100 and a network in which the mobile communication terminal 100 is located to be carried out. For example, the wireless communication unit 110 may include a broadcast receiving module 111, a mobile communication module 112, a wireless Internet module 113, a short-range communication module 114, a location information module 115, and the like.

The broadcast receiving module 111 receives broadcast signals and/or broadcast associated information from an external broadcast management server through a broadcast channel. The broadcast channel may include a satellite channel and/or a terrestrial channel. The broadcast management server may denote a server that generates and transmits a broadcast signal and/or broadcast associated information or a server that receives a previously generated broadcast signal and/or broadcast associated information and transmits it to the mobile communication terminal 100. The broadcast associated information may denote information regarding a broadcast channel, a broadcast program, a broadcast service provider, and the like. The broadcast signal may include a TV broadcast signal, a radio broadcast signal and a data broadcast signal as well as a broadcast signal in a form that a data broadcast signal is combined with the TV or radio broadcast signal.

On the other hand, the broadcast associated information may also be provided through a mobile communication network, and in this case, the broadcast associated information may be received by the mobile communication module 112. The broadcast signal may exist in various forms. For example, it may exist in the form of an electronic program guide (EPG) of digital multimedia broadcasting (DMB), electronic service guide (ESG) of digital video broadcast-handheld (DVB-H), and the like.

The broadcast receiving module 111 may receive a broadcast signal using various types of broadcast systems. In particular, the broadcast receiving module 111 may receive a digital broadcast signal using a digital broadcast system such as digital multimedia broadcasting-terrestrial (DMB-T), digital multimedia broadcasting-satellite (DMB-S), media forward link only (MediaFLO), digital video broadcast-handheld (DVB-H), integrated services digital broadcast-terrestrial (ISDB-T), and the like. The broadcast receiving module 111 is, of course, configured to be suitable for every broadcast system that provides a broadcast signal as well as the above-mentioned digital broadcast systems. The broadcast signal and/or broadcast-associated information received through the broadcast receiving module 111 may be stored in the memory 160.

The mobile communication module 112 transmits and/or receives a radio signal to and/or from at least one of a base station, an external terminal and a server over a mobile communication network. Here, the radio signal may include a voice call signal, a video call signal and/or various types of data according to text and/or multimedia message transmission and/or reception.

The wireless Internet module 113 means a module for supporting wireless Internet access. The wireless Internet module 113 may be built-in or externally installed to the mobile communication terminal 100. Here, it may be used a wireless Internet access technique including a WLAN (Wireless LAN), Wi-Fi, WiBro (Wireless Broadband), Wi-Max (World Interoperability for Microwave Access), HSDPA (High Speed Downlink Packet Access), and the like.

The short-range communication module 114 means a module for supporting a short-range communication. Here, it may be used a short-range communication technology including Bluetooth, Radio Frequency Identification (RFID), Infrared Data Association (IrDA), Ultra Wideband (UWB), ZigBee, and the like.

The location information module 115 is a module for checking or acquiring a location of the mobile terminal. A GPS module is an example. The GPS module receives location information from a plurality of satellites. Here, the location information may include coordinate information represented by latitude and longitude values. For example, the GPS module may measure an accurate time and distance from three or more satellites, and accurately calculate a current location according to trigonometry based upon three different distances. A method of acquiring distance and time information from three satellites and performing error correction with a single satellite may be used. In particular, the GPS module may acquire an accurate time together with three-dimensional speed information as well as the location of the latitude, longitude and altitude values from the location information received from the satellites. For the location information module 115, a Wi-Fi positioning system and/or a hybrid positioning system may be applicable thereto.

The A/V (audio/video) input unit 120 receives an audio or video signal, and the A/V (audio/video) input unit 120 may include a camera 121 and a microphone 122. The camera 121 processes an image frame, such as still picture or video, obtained by an image sensor in a video phone call or image capturing mode. The processed image frame may be displayed on a display unit 151.

The image frames processed by the camera 121 may be stored in the memory 160 (or other storage medium) or transmitted through the wireless communication unit 110. Two or more cameras 121 may be provided according to the configuration type and/or use environment of the mobile terminal.

The microphone 122 receives an external audio signal through a microphone in a phone call mode, a recording mode, a voice recognition mode, and the like, and processes the audio signal into electrical voice data. The processed voice data may be converted and outputted into a format capable of being transmitted to a mobile communication base station through the mobile communication module 112 in the phone call mode. The microphone 122 may implement various types of noise canceling algorithms to cancel noise generated in a procedure of receiving the external audio signal.

The user input unit 130 may generate input data to control an operation of the mobile terminal. The user input unit 130 may be configured by including a keypad, a dome switch, a touch pad (pressure/capacitance), a jog wheel, a jog switch, and the like. Particularly, when the touch pad forms an interlayer structure together with a display unit 151, it may be called a touch screen.

The sensing unit 140 detects a current status of the mobile communication terminal 100 such as an opened or closed state of the mobile communication terminal 100, a location of the mobile communication terminal 100, the presence or absence of user contact, an orientation of the mobile communication terminal 100, an acceleration or deceleration movement of the mobile communication terminal 100, and the like, and generates a sensing signal for controlling the operation of the mobile communication terminal 100. For example, when the mobile communication terminal 100 is a slide phone type, it may sense an opened or closed state of the slide phone. Furthermore, the sensing unit 140 takes charge of a sensing function associated with whether or not power is supplied from the power supply unit 190, whether or not an external device is coupled with the interface unit 170.

The interface unit 170 performs the role of interfacing with external devices connected to the mobile communication terminal 100. For example, the interface unit 170 may include a wired/wireless headset port, a memory card port, a port for connecting to a device having an identification module, an audio Input/Output (I/O) port, a video I/O port, an earphone port, and the like. Here, the identification module may be configured as a chip for storing various information required to authenticate the mobile communication terminal 100, which may include a User Identity Module (UIM), a Subscriber Identity Module (SIM), Universal Subscriber Identity Module (USIM), and the like. Furthermore, the device having the identification module (hereinafter, referred to as an "identification device") may be implemented in a type of smart card. Hence, the identification module can be connected to the mobile communication terminal 100 via a port. The interface unit 170 may receive data or power from an external device to transfer it to each constituent element in the mobile communication terminal 100 or transmit data within the mobile communication terminal 100 to the external device.

The output unit 150 is configured to provide an output for audio signal, video signal, or alarm signal, and the output unit 150 may include the display unit 151, an audio output module 152, an alarm unit 153, and the like.

The display unit 151 may display information processed in the mobile communication terminal 100. For example, when the mobile communication terminal 100 is in a phone call mode, the display unit 151 may display a User Interface (UI) or a Graphic User Interface (GUI) associated with a call. When the mobile communication terminal 100 is in a video call mode or image capturing mode, the display unit 151 may display a captured and/or received image, a UI or GUI.

The display unit 151 may include at least one of a Liquid Crystal Display (LCD), a Thin Film Transistor-LCD (TFT-LCD), an Organic Light Emitting Diode (OLED) display, a flexible display, and a three-dimensional (3D) display. There may exist two or more display units 151 according to the implementation form of the mobile communication terminal 100. For example, an external display unit (not shown) and an internal display unit (not shown) may be provided at the same time in the mobile communication terminal 100.

When the display unit 151 and a touch sensitive sensor (hereinafter, referred to as a "touch sensor") have an interlayer structure (hereinafter, referred to as a "touch screen"), the display unit 151 may be used as an input device rather than an output device. The touch sensor may be implemented as a touch film, a touch sheet, a touch pad, and the like.

The touch sensor may be configured to convert changes of a pressure applied to a specific part of the display unit 151, or a capacitance occurring from a specific part of the display unit 151, into electric input signals. Also, the touch sensor may be configured to sense not only a touched position and a touched area, but also a touch pressure. When there is a touch input to the touch sensor, the corresponding signals are transmitted to a touch controller (not shown). The touch controller processes the received signals, and then transmits corresponding data to the controller 180. Accordingly, the controller 180 may sense which region of the display unit 151 has been touched.

A proximity sensor 141 may be arranged at an inner region of the mobile communication terminal 100 covered by the touch screen, or near the touch screen. The proximity sensor 141 indicates a sensor to sense presence or absence of an object approaching to a surface to be sensed, or an object disposed near a surface to be sensed, by using an electromagnetic field or infrared rays without a mechanical contact. The proximity sensor has a longer lifespan and a more enhanced utility than a contact sensor.

The proximity sensor 141 may include an optical transmission type photoelectric sensor, a direct reflective type photoelectric sensor, a mirror reflective type photoelectric sensor, a high-frequency oscillation proximity sensor, a capacitance type proximity sensor, a magnetic type proximity sensor, an infrared rays proximity sensor, and the like. When the touch screen is implemented as a capacitance type, proximity of a pointer to the touch screen is sensed by changes of an electromagnetic field. In this case, the touch screen (touch sensor) may be categorized into a proximity sensor.

Hereinafter, for the sake of convenience of brief explanation, a status that the pointer is positioned to be proximate onto the touch screen without contact will be referred to as "proximity touch", whereas a status that the pointer substantially comes in contact with the touch screen will be referred to as "contact touch". For the position corresponding to the proximity touch of the pointer on the touch screen, such position corresponds to a position where the pointer faces perpendicular to the touch screen upon the proximity touch of the pointer.

The proximity sensor 141 senses proximity touch, and proximity touch patterns (e.g., proximity touch distance, proximity touch direction, proximity touch speed, proximity touch time, proximity touch position, proximity touch moving status, etc.). Information corresponding to the sensed proximity touch operation and the sensed proximity touch pattern may be displayed on the touch screen.

The audio output module 152 may output audio data received from the wireless communication unit 110 or stored in the memory 160, in a call signal receiving mode, a call placing mode, a recording mode, a voice recognition mode, a broadcast reception mode, and the like. The audio output module 152 may output audio signals relating to functions performed in the mobile communication terminal 100 (for example, sound alarming a call received or a message received, and the like). The audio output module 152 may include a speaker, a buzzer, and the like.

The alarm 153 outputs signals notifying occurrence of events from the portable terminal 100. The events occurring from the mobile terminal may include call received, message received, key signal input, touch input, and the like. The alarm 153 may output not only video or audio signals, but also other types of signals such as signals notifying occurrence of events in a vibration manner. When a call signal or message is received, the alarm 153 may output a vibration to notify this. Otherwise, when a key signal is inputted, the alarm 153 may output a vibration as a feedback to the inputted key signal. Through the foregoing vibration output, the user can recognize an event occurrence. The signal for notifying an event occurrence may be also outputted through the display unit 151 or the audio output module 152.

The haptic module 154 generates various tactile effects which a user can feel. A representative example of the tactile effects generated by the haptic module 154 includes vibration. Vibration generated by the haptic module 154 may have a controllable intensity, a controllable pattern, and the like. For instance, different vibration may be output in a synthesized manner or in a sequential manner.

The haptic module 154 may generate various tactile effects, including not only vibration, but also arrangement of pins vertically moving with respect to a skin being touched, air injection force or air suction force through an injection hole or a suction hole, touch by a skin surface, presence or absence of contact with an electrode, effects by stimulus such as an electrostatic force, reproduction of cold or hot feeling using a heat absorbing device or a heat emitting device, and the like.

The haptic module 154 may be configured to transmit tactile effects through a user's direct contact, or a user's muscular sense using a finger or a hand. The haptic module 154 may be implemented in two or more in number according to the configuration of the mobile communication terminal 100. The haptic module 154 may be provided at a place where the user can frequently make contact in the vehicle. For example, it may be provided at a steering wheel, a gear shift lever, and a seat.

The memory 160 may store a program for processing and controlling the controller 180. Alternatively, the memory 160 may temporarily store input/output data (e.g., map data, phonebook data, messages, audio, still images, video, and the like).

The memory 160 may be implemented using any type of suitable storage medium including a flash memory type, a hard disk type, a multimedia card micro type, a memory card type (e.g., SD or DX memory), Random Access Memory (RAM), Static Random Access Memory (SRAM), Read-Only Memory (ROM), Electrically Erasable Programmable Read-only Memory (EEPROM), Programmable Read-only Memory (PROM), magnetic memory, magnetic disk, optical disk, and the like. Also, the mobile communication terminal 100 may operate a web storage which performs the storage function of the memory 160 on the Internet.

The interface unit 170 may generally be implemented to interface the mobile device with external devices. The interface unit 170 may allow a data reception from an external device, a power delivery to each component in the mobile communication terminal 100, or a data transmission from the mobile communication terminal 100 to an external device. The interface unit 170 may include, for example, wired/wireless headset ports, external charger ports, wired/wireless data ports, memory card ports, ports for coupling devices having an identification module, audio Input/Output (I/O) ports, video I/O ports, earphone ports, and the like. Here, the identification module may be configured as a chip for storing various information required to authenticate an authority to use the mobile communication terminal 100, which may include a User Identity Module (UIM), a Subscriber Identity Module (SIM), and the like. Also, the device having the identification module (hereinafter, referred to as 'identification device') may be implemented in a type of smart card. Hence, the identification device can be coupled to the mobile communication terminal 100 via a port. The interface unit 170 may receive data or power from an external device to transfer it to each constituent element in the mobile communication terminal 100 or transmit data within the mobile communication terminal 100 to the external device.

The interface unit 170 may serve as a path for power to be supplied from an external cradle to the mobile communication terminal 100 when the mobile communication terminal 100 is connected to the external cradle or as a path for transferring various command signals inputted from the cradle by a user to the mobile communication terminal 100. Such various command signals or power inputted from the cradle may operate as signals for recognizing that the mobile device has accurately been mounted to the cradle.

The controller 180 typically controls the overall operations of the mobile communication terminal 100. For example, the controller 180 performs the control and processing associated with telephony calls, data communications, video calls, and the like. The controller 180 may include a multimedia module 181 for reproducing multimedia data. The multimedia module 181 may be implemented in an integrated manner within the controller 180 or may be implemented in a separate manner from the controller 180.

Furthermore, the controller 180 can perform a pattern recognition processing so as to recognize writing or drawing input on the touch screen as text or image.

The power supply unit 190 receives external power and internal power under the control of the controller 180 to provide power required by various components.

Various embodiments described herein may be implemented in a recording medium that can be read by a computer or similar device using software, hardware, or any combination thereof. For hardware implementation, it may be implemented by using at least one of application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electrical units designed to perform the functions described herein. In some cases, such embodiments may be implemented in the controller 180 itself. For software implementation, the embodiments such as procedures or functions may be implemented together with separate software modules. The software modules may perform at least one function or operation described herein. Software codes can be implemented by a software application written in any suitable programming language. The software codes may be stored in the memory 160 and executed by the controller 180.

The voice recognition module 182 recognizes voice uttered by the user, and performs the relevant function according to the recognized voice signal.

A navigation session 300 applied to the mobile communication terminal 100 displays a driving route on map data.

Figure 2:
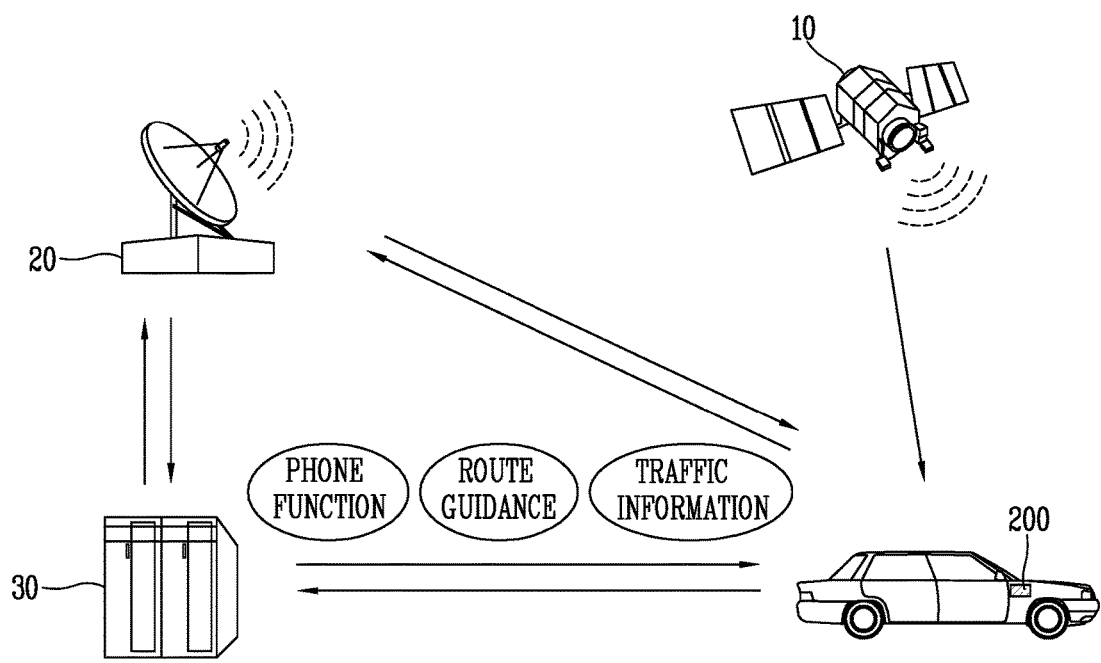
FIG. 2 is a block diagram illustrating a vehicle navigation system for explaining the embodiments of the present disclosure.

FIG. 2 is a block diagram illustrating a vehicle navigation system according to the embodiments of the present disclosure.

As illustrated in FIG. 2, a vehicle navigation system may be configured by including an information providing center 30 for providing traffic information and various data (for example, programs, execution files, etc.), and a telematics terminal 200 mounted within a vehicle for receiving traffic information through a long-range wireless communication network 20 and/or a short-range wireless communication network, and providing a road guide service based on a GPS signal received through a satellite 10 and the traffic information. Here, the communication network may further include a wired or wireless communication network such as local area network (LAN), wide area network (WAN), and the like.

Various traffic information (for example, road traffic information or interesting area information) as well as traffic light information are collected via the communication network, and the collected information are processed by the information providing center 30 (for example, a server) according to Transport Protocol Expert Group (TPEG) standard so as to be sent to a broadcasting station. Accordingly, the broadcasting station inserts such traffic information including the traffic light information in a broadcast signal and broadcasts the broadcast signal to the telematics terminal 200.

The server may reconstruct various traffic information, which are collected via different paths connected to the communication network, for example, collected by an operator's input, via a wired/wireless Internet and digital broadcast services, such as Transport Data Channel (TDC) and Multimedia Object Transport (MOC), or from other servers or a probe car, into a traffic information format, such as a format according to the TPEG standard, which is a standard for traffic information services, thereby sending the reconstructed traffic information to the broadcasting station.

The server may thus generate the traffic information format of the TPEG standard including traffic light information to send to the broadcasting station.

The broadcasting station may then load the traffic information including the traffic light information received from the server in a broadcast signal and wirelessly send the broadcast signal to the telematics terminal 200, for example, a navigation apparatus, which is mounted in the vehicle to play a role of a traffic information receiving terminal. The traffic information may include not only the traffic light information but also information related to various traffic conditions, which are required for running vehicles, ships and flights, such as accidents, road conditions, traffic jam, road construction, road block, public traffic network delay, flight delay and the like.

The broadcasting station may receive the traffic information including the traffic light information processed by the server, and send the same to the telematics terminal 200 via a digital signal according to various digital broadcasting standards, examples of which may include European Digital Audio Broadcasting (DAB) based on Eureka-147 [ETSI EN 300 401], Digital Multimedia Broadcasting-terrestrial/satellite (DMB-T/S), Digital Video Broadcasting-terrestrial (DVB-T), portable Digital Video Broadcasting-Handheld (DVB-H), Media Forward Link Only (MFLO), and the like.

Furthermore, the broadcasting station may send the traffic information including the traffic light information via a wired/wireless network, such as a wired/wireless Internet.

The vehicle 200 indicates any transport of a typical car, bus, train, ship, flight and the like, which are made by employing mechanical and electronic devices for the purpose of carrying or transporting humans or objects.

The vehicle 200 has a traffic information receiving terminal to receive traffic light information from the broadcasting station. The traffic light information is processed to be sent to a user in a graphic, text and/or audio format(s).

Hereinafter, the configuration of a telematics terminal 200 for explaining an embodiment of the present disclosure will be described with reference to FIG. 3.

Figure 3:
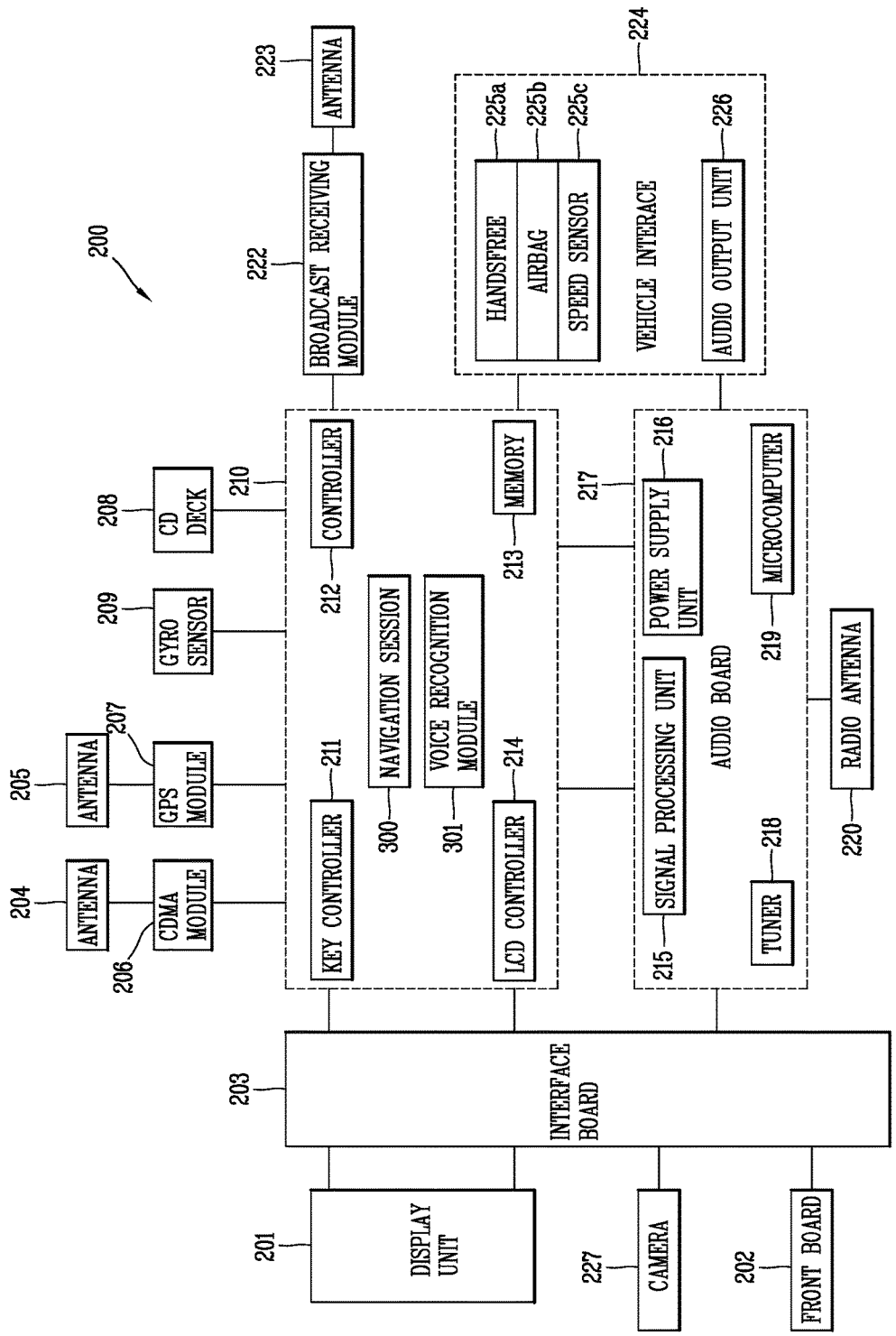
FIG. 3 is a block diagram illustrating the configuration of a telematics terminal system for explaining the embodiments of the present disclosure.

FIG. 3 is a block diagram illustrating the configuration of a telematics terminal 200 for explaining embodiments of the present disclosure.

As shown in FIG. 3, the telematics terminal 200 may include a main board 210. The main board 210 may include a controller (for example, a central processing unit (CPU)) 212 for overall control of the telematics terminal 200, a memory 213 for storing various types of information, a key controller 211 for control of various types of key signals, and a liquid crystal display (LCD) controller 214 for control of LCD.

The memory 213 may store map information (map data) for displaying road guidance information on a digital map. Also, the memory 213 may store a traffic information collection control algorithm for allowing input of traffic information according to road conditions that a vehicle is currently traveling, and information for control of the algorithm.

The main board 210 may include a code division multiple access (CDMA) module 206 which is a mobile communication terminal provided with a unique device number and integrated into a vehicle, a GPS module 207 for receiving a Global Positioning System (GPS) signal to guide a location of a vehicle, track a traveling route from a depart point to an arrival point, etc., or transmitting traffic information collected by a user using a GPS signal, a compact disk (CD) deck 208 for reproducing a signal recorded on a CD; a gyro sensor 209, and the like. The CDMA module 206 and the GPS module 207 may transmit and receive signals via antennas 204 and 205, respectively.

Furthermore, the broadcast receiving module 222 may be connected to the main board 210 to receive a broadcast signal via an antenna 223. The main body 210 may be connected, via an interface board 203, with a display (LCD) 201 controlled by the LCD controller 214, a front board 202 controlled by the key controller 211, and a camera 227 for capturing inside and/or outside of the vehicle. The display 201 may display various video signals, text signals and the like. The front board 202 may be provided with buttons for various types of key signal inputs, and provide a key signal corresponding to the user-selected button to the main board 210. Also, the display 201 may include the proximity sensor and the touch sensor (touch screen) shown in FIG. 2.

The front board 202 may include a menu key for allowing direct input of traffic information. The menu key may be controlled by the key controller 211.

An audio board 217 may be connected to the main board 210 to process various audio signals. The audio board 217 may include a microcomputer 219 for control of the audio board 217, a tuner 218 for receiving a radio signal, a power supply unit 216 for supplying power to the microcomputer 219, and a signal processor 215 for processing various audio signals.

Furthermore, the audio board 217 may further include a radio antenna 220 for receiving a radio signal.

The audio output unit (amplifier) 226 may be connected to a vehicle interface 224. That is, the audio board 217 and the main board 210 may be connected to the vehicle interface 224. The vehicle interface 224 may also be provided for connection of a hands-free 225*a* for inputting a voice signal, an airbag 226*b* for safety of a passenger, a speed (velocity) sensor 225*c* for detecting the vehicle speed, and the like. The speed sensor 225*c* may calculate the vehicle speed and provide the calculated speed information to the controller (CPU) 212.

A navigation session 300 applied to the telematics terminal 200 may generate road guidance information based upon map data and current location information related to the vehicle, and notify a user of the generated road guidance information.

The display 201 may detect a proximity touch within a display window via a proximity sensor. For example, the display 201 detects a location of a proximity touch when a pointer (for example, a finger or a stylus pen) generates the proximity touch, and outputs location information corresponding to the detected location to the controller 212.

A voice recognition device (or voice recognition module) 301 may recognize a user's voice, and perform a corresponding function according to the recognized voice signal.

The navigation session 300 applied to the telematics terminal 200 may display a driving route on map data, and automatically form a wireless network with a terminal (for example, vehicle navigation apparatus) mounted on a nearby vehicle and/or a mobile communication terminal carried by a nearby pedestrian through a wireless communication network (for example, short-range radio communication network) when the mobile communication terminal 100 is located within a predetermined distance from a dead zone included in the driving path, thereby receiving the location information of the nearby vehicle from the terminal mounted on the nearby vehicle, and receiving the location information of the nearby pedestrian from the mobile communication terminal carried by the nearby pedestrian.

Figure 4:
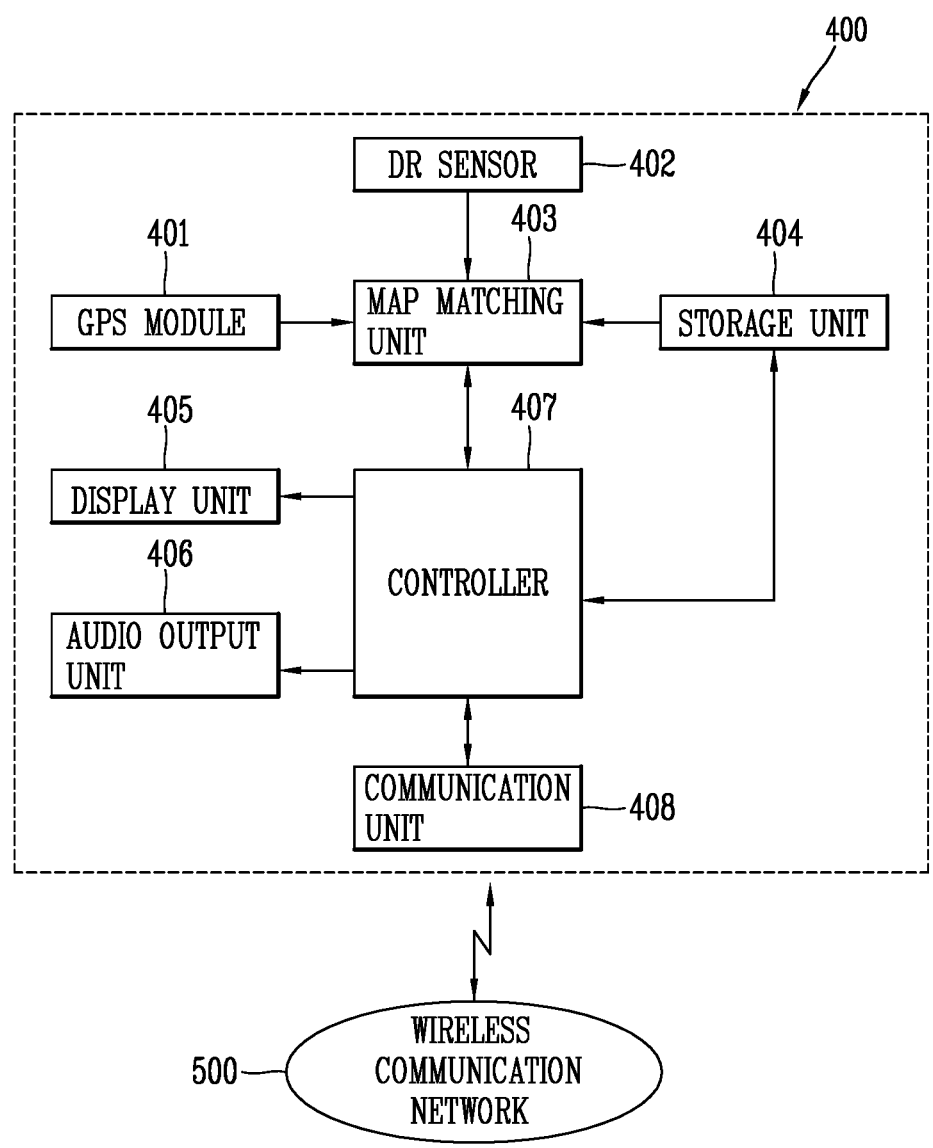
FIG. 4 is a block diagram illustrating the configuration of a navigation (vehicle navigation) apparatus for explaining the embodiments of the present disclosure.

FIG. 4 is a block diagram illustrating the configuration of a navigation (vehicle navigation) apparatus 400 to which an vehicle control apparatus according to embodiments of the present invention is applied.

The navigation (vehicle navigation) apparatus 400 can be classified into in-dash type and on-dash type depending on how the navigation vehicle 400 is installed in the vehicle 200. An in-dash type navigation (vehicle navigation) apparatus is the one that is firmly installed by being inserted in a predetermined space assigned in a dashboard of the vehicle 200. An on-dash type navigation (vehicle navigation) apparatus is either attached on a dash board of the vehicle 200 or installed by using a dedicated mount near the dash board. Since the on-dash type navigation (vehicle navigation) can be detached or attached, it can be separated from the vehicle 200 to be carried by the user.

The navigation (vehicle navigation) apparatus 400 according to an embodiment of the present invention includes both the aforementioned in-dash and on-dash type navigation (vehicle navigation) apparatuses. In addition, the navigation (vehicle navigation) apparatus 400 further includes all kinds of information processing devices, such as various portable terminals, capable of receiving and/or processing of traffic information to carry out a navigation function in association with a global positioning system (GPS) receiver receiving navigation messages transmitted from GPS satellites in the vehicle 200.

As illustrated in FIG. 4, the navigation apparatus may include a GPS module 401 for receiving a global positioning system (GPS) signal received from a satellite and generating first vehicle position data of a mobile vehicle navigation apparatus (assumed to be in the same location as the telematics terminal 200 or mobile communication terminal 100) based on the received GPS signal; a dead-reckoning (DR) sensor 402 for generating second vehicle position data based on a traveling direction of a vehicle and the vehicle speed; a storage unit (or memory) 404 for storing map data and various information; a map matching unit 403 for generating an estimated vehicle position based on the first vehicle position data and the second vehicle position data, and matching the generated vehicle position to a link (map matching link or map matching road) in the map data stored in the storage unit 404, and outputting the matched map information (map matching result); a communication unit 408 for receiving real-time traffic information from an information providing center and/or neighboring vehicles through a wireless communication network 500 and carrying out a phone communication; a controller 407 for generating road guide information based on the matched map information (map matching result); a display unit 405 for displaying a road guide map (including POI information) included in the road guide information and the traffic information; and an audio output unit 406 for outputting an audio signal corresponding to road guide voice information (road guide voice message) included in the road guide information or the traffic information.

Here, the communication unit 408 may further include a hands-free having a Bluetooth module, and receive a broadcast signal including traffic information in a TPEG format from the broadcasting station through an antenna. The broadcast signal includes video and audio data according to various specifications, such as terrestrial or satellite digital multimedia broadcasting (DMB), digital audio broadcasting (DAB), digital video broadcasting (DVB-T, DVB-H), and the like. In addition, the broadcast signal includes traffic information according to traffic information (TPEG) services and binary format for scene (BIFS) data services, and supplementary information such as various supplementary data. Moreover, the communication unit 408 synchronizes a signal bandwidth provided with traffic information, demodulates the synchronized signal, and outputs the decoded signal to the TPEG decoder (included in a controller 407).

The TPEG decoder decodes traffic information in a TPEG format and provides a variety of information including traffic lights information included in the traffic information to the controller 407.

Furthermore, the road guide information may include various information associated with travel, such as traffic lane information, travel speed limit information, turn-by-turn information, traffic safety information, traffic guide information, vehicle information, road search information, and the like, as well as map data.

The signal received through the GPS module 401 may be configured to provide the location information of a terminal to the navigation apparatus 400 using wireless communication methods proposed by the Institute of Electrical and Electronics Engineers (IEEE), such as the IEEE 802.11 Wireless Network Standard for a wireless LAN including wireless LANs, some of infrared communications, etc., the IEEE 802.15 Standard for a wireless personal area network (PAN) including Bluetooth, UWB, ZigBee, etc., the IEEE 802.16 Standard for a wireless metropolitan area network (MAN) broadband wireless access (BWA) including fixed wireless accesses (FWA), etc., and the IEEE 802.20 Mobile Internet Standard for a wireless MAN mobile broadband wireless access (MBWA) including Wibro, WiMAX, etc.

An input unit may be further provided in the navigation apparatus 400, and the input unit selects the user's desired function or receives information, and various devices may be used such as a keypad, a touch screen, a jog shuttle, a microphone, and the like.

The map matching unit 403 generates an estimated location of the vehicle on the basis of the first location data and the second location data, and reads map data corresponding to a travel path from the storage unit 404.

The map matching unit 403 matches the estimated location of the vehicle with a link (road) included in the map data, outputs the matched map information (map-matched result) to the controller 407. For example, the map matching unit 403 generates an estimated location of the vehicle on the basis of the first location data and the second location data, matches the generated estimated location of the vehicle with links within the map data stored in the storage unit 404 based upon the link sequence thereof, and outputs the matched map information (map-matched result) to the controller 407. The map matching unit 403 may output road attribute information such as single-level or double-level roads included in the matched map information (map-matched result) to the controller 407. Furthermore, the function of the map matching unit 403 may be implemented by the controller 407.

The storage unit 404 stores map data. At this time, the stored map data may include a geographic coordinate (or longitude and latitude coordinate) for displaying the longitude and latitude in the Degree/Minute/Second (DMS) unit. Here, the stored map data may use the Universal Transverse Mercator (UTM) coordinate, the Universal Polar System (UPS) coordinate, the Transverse Mercator (TM) coordinate, and the like, in addition to the geographic coordinate.

The storage unit 404 stores various information, such as various menu screens, points of interest (hereinafter, "POI"), function characteristic information based upon specific locations of the map data, and the like.

The storage unit 404 stores various user interfaces (UI) and/or graphic user interfaces (GUI).

The storage unit 404 stores data, programs, and the like, which are required for operating the navigation device 400.

The storage unit 404 stores destination information inputted from the user through the input unit. Here, the destination information may be a destination, or either one of a departure and a destination.

The display unit 405 displays image information (or road guide map) included in the road guide information generated by the controller 407. Here, the display unit 405 may include a touch sensor (touch screen) or proximity sensor. Furthermore, the road guide information may include various information associated with driving a vehicle, such as traffic lane information, driving speed limit information, turn-by-turn information, traffic safety information, traffic guide information, vehicle information, road search information, and the like, in addition to map data.

Furthermore, when displaying the image information, the display unit 405 may display various contents, such as various menu screens, road guide information, and the like, using user interfaces and/or graphic user interfaces included in the storage unit 404. Here, the contents displayed on the display unit 405 include various text or image data (including map data or various information data), and menu screens including icons, list menus, combo boxes, and the like.

The audio output unit 406 outputs voice information (or voice messages for road guide information) included in the road guide information generated by the controller 407. Here, the audio output unit 406 may be an amplifier or speaker.

The controller 407 generates road guide information on the basis of the matched map information, and outputs the generated road guide information to the display unit 405 and audio output unit 406. Here, the display unit 405 displays the road guide information.

The controller 407 receives real-time traffic information from the information providing center and/or a terminal mounted on a neighboring vehicle (vehicle navigation device) to generate road guide information.

Furthermore, the controller 407 is connected with a call center through a communication unit 408 to perform a phone call, transmit or receive information between the navigation device 400 and the call center. Here, the communication unit 408 may further include a hands-free module having a Bluetooth function using a short-range wireless communication method.

When a PIO search menu is selected by the user, the controller 407 retrieves POI located on a path from the current location to the destination, and displays the retrieved POI on the display unit 405. At this time, the controller 407 retrieves POI (a position at which the path is not to be changed (retrieved again), for example, POI located at the left or right side of the driving road) located on the path and/or POI (a position at which the path is to be changed, for example, a position at which a preset path should be changed to pass through the nearby POI) located in the vicinity of the path, and display the retrieved POI on the display unit 405.

Hereinafter, an information providing apparatus (telematics terminal 200) and a method thereof capable of linking with a plurality of homogeneous or heterogeneous terminals within a vehicle, and easily and quickly receiving users' desired application programs from the plurality of terminals to easily and effectively use information (for example, application programs, content, data, etc.) stored in the plurality of terminals, respectively, will be described. The plurality of terminals may be homogeneous terminals or heterogeneous terminals. An information providing apparatus according to the embodiments of the present disclosure may include a communication unit 206 configured to form a communication network with a plurality of terminals within a vehicle; a display unit 201 configured to display a vehicle image; and a controller 212 configured to receive the identification information of the plurality of terminals and the location information of the terminals through the communication unit 206, and display the locations of the received terminals on the vehicle image, and display terminal images corresponding to the identification information on the displayed terminal locations.

Figure 5:
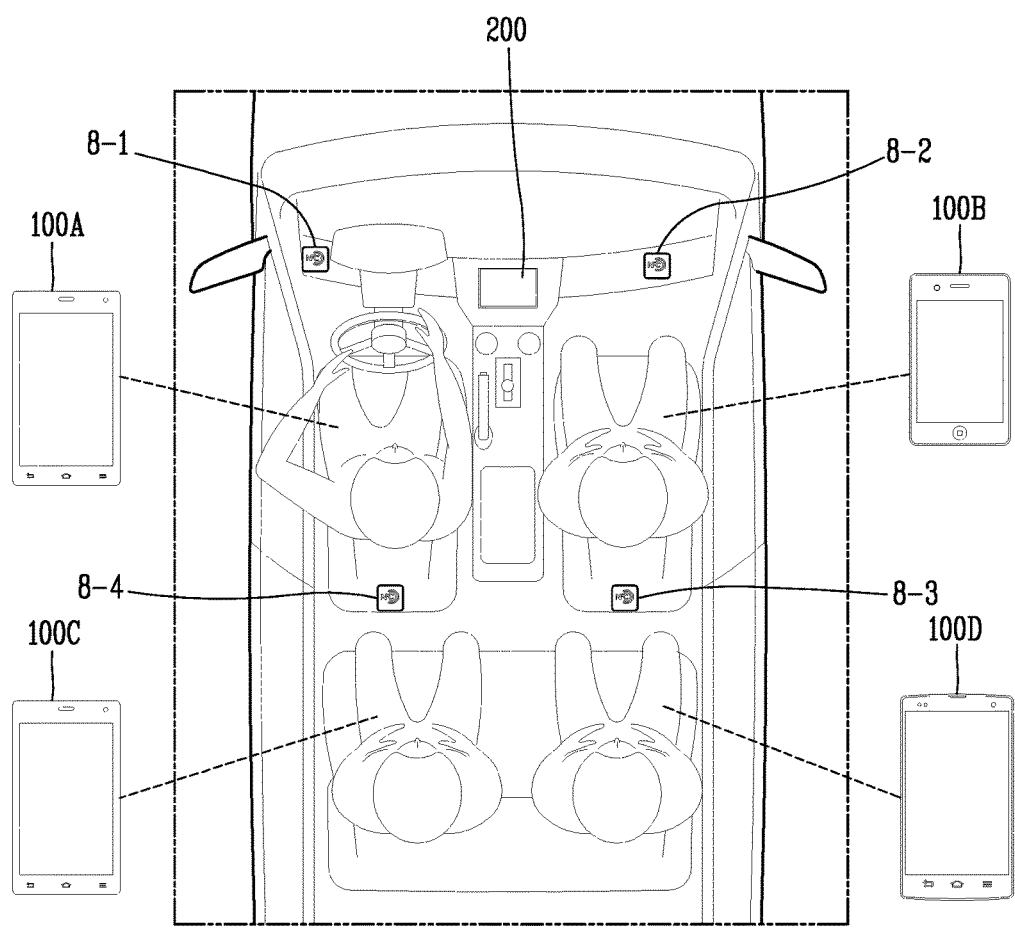
FIG. 5 is an exemplary view illustrating a plurality of terminals linked with each other within a vehicle according to the embodiments of the present disclosure.

FIG. 5 is an exemplary view illustrating a plurality of terminals linked with each other within a vehicle according to the embodiments of the present disclosure.

As illustrated in FIG. 5, the plurality of terminals may be configured with a telematics terminal (or head unit) 200 and a plurality of mobile communication terminals 100A, 100B, 100C, 100D, and the plurality of terminal may be connected to each other through a wireless or wired communication network. The telematics terminal 200 may be used by a vehicle driver, and the plurality of mobile communication terminals 100 may be used by a vehicle passenger (or vehicle passengers).

A navigation apparatus may be used or the mobile communication terminal 100 may be used instead of the telematics terminal 200. A plurality of rear seat entertainment (RSE) systems, portable phones, smart phones, notebook computers, digital broadcast terminals, personal digital assistants (PDAs), portable multimedia players (PMPs), tablet personal computers (PCs), and the like may be also used instead of the plurality of mobile communication terminals 100. Hereinafter, the telematics terminal 200 and one or more mobile communication terminals 100 will be described for example.

The telematics terminal 200 may link with a plurality of terminals within a vehicle, and easily and quickly receive and execute users' desired application programs from the plurality of terminals, thereby easily and effectively using information (for example, application programs, content, data, etc.) stored in the plurality of terminals, respectively.

The mobile communication terminal 100 may link with the telematics terminal 200 within a vehicle and other mobile communication terminals within the vehicle, and easily and quickly receive and execute users' desired application programs from the telematics terminal 200 and the other mobile communication terminals, thereby easily and effectively using information (for example, application programs, content, data, etc.) stored in a plurality of terminals, respectively. In other words, the plurality of terminals may exchange information with each other within the vehicle, and hereinafter, an apparatus and a method thereof capable of linking with a plurality of terminals within a vehicle, and easily and quickly receiving and executing users' desired application programs from the plurality of terminals, thereby easily and effectively using information (for example, application programs, content, data, etc.) stored in the plurality of terminals, respectively, will be described.

As illustrated in FIG. 5, an information providing apparatus according to the embodiments of the present disclosure may further include a location information generator configured to generate the current location information of a plurality of mobile communication terminals within a vehicle. The location information generator may include a first near field communication (NFC) (or radio-frequency identification (RFID) tag 8-1 installed on the driver's seat of the vehicle to generate the first location information indicating the driver's seat position of the vehicle; a second NFC tag 8-2 installed on the passenger seat of the vehicle to generate the second location information indicating the passenger seat position of the vehicle; a third NFC tag 8-3 installed on the back seat of the passenger seat of the vehicle to generate the third location information indicating the back seat position of the passenger seat of the vehicle; and a fourth NFC tag 8-4 installed on the back seat of the driver's seat of the vehicle to generate the fourth location information indicating the back seat position of the driver's seat of the vehicle.

For example, when a specific mobile communication terminal is adjacent to the first NFC tag 8-1, the first NFC tag 8-1 transmits the first location information to the specific mobile communication terminal. The specific mobile communication terminal receives the first location information from the first NFC tag 8-1, and transmits the identification information of the specific mobile communication terminal along with the received first location information to the controller 212.

When a specific mobile communication terminal is adjacent to the second NFC tag 8-2, the second NFC tag 8-2 transmits the second location information to the specific mobile communication terminal. The specific mobile communication terminal receives the second location information from the second NFC tag 8-2, and transmits the identification information of the specific mobile communication terminal along with the received second location information to the controller 212.

When a specific mobile communication terminal is adjacent to the third NFC tag 8-3, the third NFC tag 8-3 transmits the third location information to the specific mobile communication terminal. The specific mobile communication terminal receives the third location information from the third NFC tag 8-3, and transmits the identification information of the specific mobile communication terminal along with the received third location information to the controller 212.

When a specific mobile communication terminal is adjacent to the fourth NFC tag 8-4, the fourth NFC tag 8-4 transmits the fourth location information to the specific mobile communication terminal. The specific mobile communication terminal receives the fourth location information from the fourth NFC tag 8-4, and transmits the identification information of the specific mobile communication terminal along with the received fourth location information to the controller 212.

The location information generator may include a first USB module installed on the driver's seat of the vehicle to provide the first location information indicating the driver's seat position of the vehicle to the controller 212; a second USB module installed on the passenger seat of the vehicle to provide the second location information indicating the passenger seat position of the vehicle to the controller 212; a third USB module installed on the back seat of the passenger seat of the vehicle to provide the third location information indicating the back seat position of the passenger seat of the vehicle to the controller 212; and a fourth USB module installed on the back seat of the driver's seat of the vehicle to provide the fourth location information indicating the back seat position of the driver's seat of the vehicle to the controller 212.

Furthermore, the controller 212 may detect the location information of a mobile communication terminal within a vehicle based on a plurality of beacons (for example, Bluetooth low energy beacons) installed within the vehicle. For example, the controller 212 may detect the location of a mobile communication terminal within a vehicle through a triangulation technology using the beacon.

Furthermore, the mobile communication terminal 100 may display a location-setting menu within a vehicle on the display unit 151 according to a user's request. The location-setting menu within a vehicle may include a first item indicating a driver's seat position, a second item indicating a passenger seat position, a third item indicating a back seat position of the passenger seat, and a fourth item indication a back seat position of the driver's seat.

When the first item is selected by the user, the mobile communication terminal 100 generates first location information indicating a driver's seat position and transmits the first location notification information to the controller 212. When the second item is selected by the user, the mobile communication terminal 100 generates second location information indicating a passenger seat position and transmits the second location notification information to the controller 212. When the third item is selected by the user, the mobile communication terminal 100 generates third location information indicating a back seat position of the passenger seat and transmits the third location notification information to the controller 212. When the fourth item is selected by the user, the mobile communication terminal 100 generates fourth location information indicating a back seat of the driver's seat and transmits the fourth location notification information to the controller 212.

The communication unit 206 forms a wireless communication network or wired communication network to one or more mobile communication terminals within a vehicle according to a user's request. For example, the communication unit 206 forms a wireless communication unit or wired communication network to one or more mobile communication terminals within a vehicle according to a user's request or forms a wireless communication unit or wired communication network to one or more mobile communication terminals when a communication request is received from the one or more mobile communication terminals within the vehicle. The user's request may be any one of voice recognition for wireless or wired communication network connection, a touch input for wireless or wired communication network connection, a gesture for wireless or wired communication network connection, and a button for wireless or wired communication network connection.

When the telematics terminal 200 mounted on a vehicle and a mobile communication terminal within the vehicle are connected to each other through a communication network, the controller 212 displays an image indicating that the communication network is being connected thereto on the display unit 201. The present disclosure regards the telematics terminal 200 as a vehicle.

When the telematics terminal 200 (regarded as a vehicle) mounted on a vehicle and the mobile terminal within the vehicle complete communication network connection to each other, the controller 212 displays an image indicating the communication network connection complete on the display unit 201. When the telematics terminal 200 mounted on a vehicle and the mobile terminal within the vehicle complete communication network connection to each other, the controller 212 may change a vehicle image and a mobile communication terminal image contained in an image indicating the communication network complete to a predetermined color (for example, blue, red, etc.) or change the vehicle image and mobile terminal image to a predetermined shape (for example, a circle, a rectangle, a star shape, etc.)

When a wireless communication network or wired communication network to the mobile communication terminal is formed, the controller 212 displays a prestored vehicle image on the display unit 201. When the prestored vehicle image is selected by the user, the controller 212 may display a background screen (or application page) including the application program icons (for example, Internet icon, navigation icon, video icon, music icon, etc.) of the telematics terminal 200 on the display unit 201.

The controller 212 displays the vehicle image on the display unit 201, and then receives the identification information and the location information from the mobile communication terminal 100 through the communication unit. The received identification information may include the type information, model information, serial information, and the like, and the received location information indicates location information for notifying that the mobile communication terminal 100 is located at which position of the driver's seat position, passenger seat position, back seat position of the passenger seat, and back seat position of the driver's seat.

The controller 212 displays the received location information on the vehicle image, and displays a mobile communication terminal image corresponding to the identification information on the displayed location information.

Figure 6:
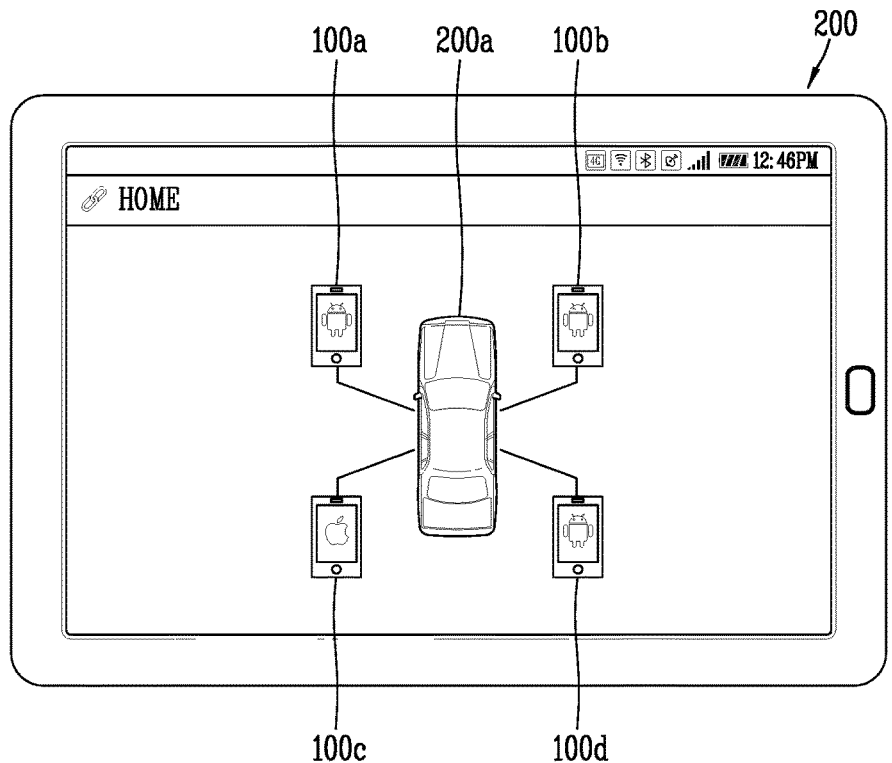
FIG. 6 is an exemplary view illustrating an image of a mobile communication terminal displayed on a vehicle image according to an embodiment of the present disclosure.

FIG. 6 is an exemplary view illustrating an image of a mobile communication terminal displayed on a vehicle image according to an embodiment of the present disclosure.

As illustrated in FIG. 6, when a wireless communication network or wired communication network to the mobile communication terminal is fondled, the controller 212 displays the vehicle image 200*a* on the display unit 201.

When first location information and first identification information are received from a first mobile communication terminal 100A among a plurality of mobile communication terminals within the vehicle, the controller 212 displays the first location information on the vehicle image 200*a*, and displays a first mobile communication terminal image 100*a* corresponding to the first identification information on the displayed first location information. For example, assuming that the first location information is information indicating the driver's seat position of the vehicle, the controller 212 may display the first mobile communication terminal image 100a on the driver's seat position of the vehicle image 200a, thereby allowing the user to intuitively checking that the first mobile communication terminal 100A at the driver's seat position of the vehicle is connected to the telematics terminal 200.

When second location information and second identification information are received from a second mobile communication terminal 100B among a plurality of mobile communication terminals within the vehicle, the controller 212 displays the second location information on the vehicle image 200a, and displays a second mobile communication terminal image 100b corresponding to the second identification information on the displayed second location information. For example, assuming that the second location information is information indicating the passenger seat position of the vehicle, the controller 212 may display the second mobile communication terminal image 100b on the passenger seat position of the vehicle image 200a, thereby allowing the user to intuitively checking that the second mobile communication terminal 100B at the passenger seat position of the vehicle is connected to the telematics terminal 200.

When third and fourth location information and third and fourth identification information are received from a third and a fourth mobile communication terminal 100C, 100D among a plurality of mobile communication terminals within the vehicle, the controller 212 displays the third and the fourth location information, respectively, on the vehicle image 200a, and displays a third and a fourth mobile communication terminal image 100c, 100d corresponding to the third and the fourth identification information on the displayed third and the fourth location information. For example, assuming that the third location information is information indicating the back seat position of the passenger seat of the vehicle, the controller 212 may display the third mobile communication terminal image 100d on the back seat position of the passenger seat of the vehicle image 200a, thereby allowing the user to intuitively checking that the third mobile communication terminal 100C at the back seat position of the passenger seat of the vehicle is connected to the telematics terminal 200.

Assuming that the fourth location information is information indicating the back seat position of the driver's seat of the vehicle, the controller 212 may display the fourth mobile communication terminal image 100c on the back seat position of the driver's seat of the vehicle image 200a, thereby allowing the user to intuitively checking that the fourth mobile communication terminal 100D at the back seat position of the driver's seat of the vehicle is connected to the telematics terminal 200.

Figure 7:
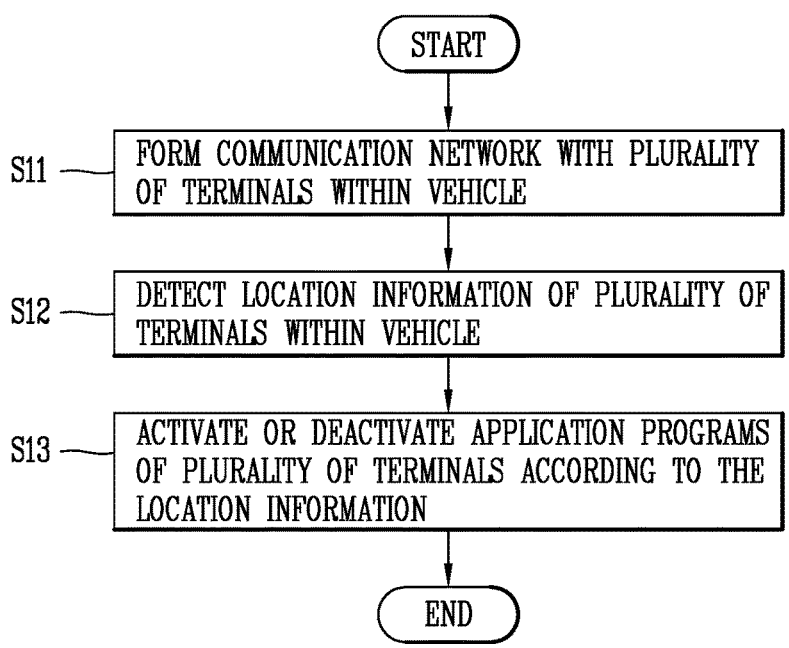
FIG. 7 is a flow chart illustrating an information providing method according to an embodiment of the present disclosure.

FIG. 7 is a flow chart illustrating an information providing method according to an embodiment of the present disclosure.

Figures 8, 9:
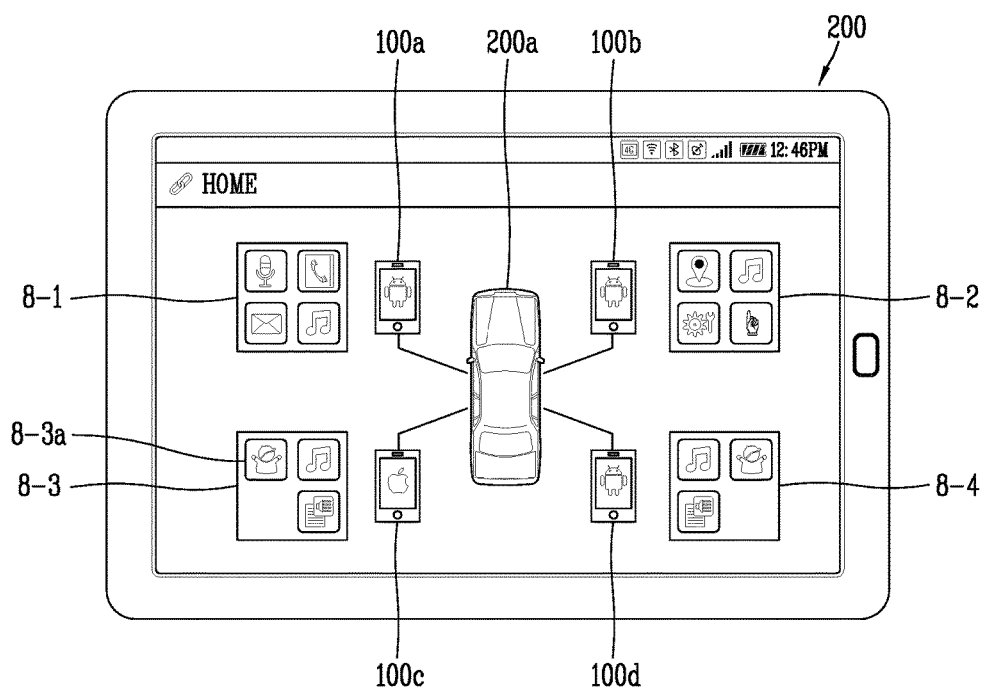
FIG. 8 is an exemplary view illustrating icons indicating application programs displayed on a vehicle image according to an embodiment of the present disclosure.
FIG. 9 is an exemplary view illustrating a menu for activating or deactivating the application programs of a plurality of mobile communication terminals according to the embodiments of the present disclosure.

FIG. 8 is an exemplary view illustrating icons indicating application programs displayed on a vehicle image according to an embodiment of the present disclosure.

First, when at least one or more of the first through the fourth mobile communication terminals 100A-100D is connected thereto, the controller 212 forms a communication network to the at least one or more mobile communication terminals (S11), and displays the vehicle image 200a on the display unit 201, and displays images 100a-100d corresponding to the at least one of more mobile communication terminals on the vehicle image 200a. For example, the controller 212 displays the first mobile communication terminal image 100a at the driver's seat position of the vehicle image 200a, and displays the second mobile communication terminal image 100b at the passenger seat position of the vehicle image 200a.

The controller 212 detects the location information (seat position information) of at least one or more mobile communication terminals corresponding to through the communication network (S12). For example, the controller 212 detects that the location information of the at least one or more mobile communication terminals is a driver's seat, a passenger seat, a back seat of the driver's seat or a back seat of the passenger seat.

The controller 212 activates or deactivates the application program(s) of the at least one or more mobile communication terminals according to the location information of the at least one or more mobile communication terminals (S13). For example, the controller 212 may activate application programs (for example, an application program associated with music, an application program for making a call, an application program associated with a message, etc.), which are not interfered with or helpful for vehicle driving, and deactivate application programs (for example, a video application program, an application program for controlling a heating, ventilation, and air conditioning (HVAC) system, etc.), which are interfered with vehicle driving, among the application programs of the first mobile communication terminal 100A corresponding to the driver's seat position of the vehicle image 200a.

The controller 212 may activate application programs (for example, an application program associated with music, an application program for controlling a heating, ventilation, and air conditioning (HVAC) system, an application program associated with navigation (for example, changing destination), etc.), which are not interfered with or helpful for vehicle driving, and deactivate application programs (for example, an application program for making a call, an application program associated with a message, etc.), which are interfered with vehicle driving, among the application programs of the second mobile communication terminal 100B corresponding to the passenger seat position of the vehicle image 200a. The application programs which are not interfered with or helpful for vehicle driving and the application programs which are interfered with vehicle driving may be changed according to the user's or designer's intention.

The controller 212 may activate or deactivate the application program(s) of the at least one or more mobile communication terminals based on the location information (seat position information) of the at least one or more mobile communication terminals, and display information indicating the activated or deactivated application program(s) along with the vehicle image 200a on the display unit 201.

The controller 212 may display images 100a-100d corresponding to the plurality of mobile communication terminals at locations corresponding to the seat position information on the vehicle image 200a, and display information 8-1, 8-2, 8-3, 8-4 indicating the activated or deactivated application programs on the images 100a-100d corresponding to the plurality of mobile communication terminals. The activated application programs may be deactivated, and the deactivated application programs may be activated according to a user's input to the information 8-1, 8-2, 8-3, 8-4 indicating the activated or deactivated application programs. For example, the controller 212 may deactivate an activated application program corresponding to a first icon when the first icon of the information 8-1, 8-2, 8-3, 8-4 indicating the activated application programs is long touched, and activate a deactivated application program corresponding to the first icon when the first icon is long touched again.

The controller 212 may link a plurality of mobile communication terminals 100A-100D within a vehicle, thereby allowing services and information providing subject thereof to be dynamically set according to various information and criteria.

The controller 212 may receive a driver's basic preference information from a server, a memory 213 or the driver's mobile communication terminal 100A, and set the configuration of services and resources of a plurality of mobile communication terminals 100A-100D within the vehicle, service accessibility and control range in a different manner from each other.

The controller 212 may set the configuration of services and resources of a plurality of mobile communication terminals 100A-100D within the vehicle, service accessibility and control range in a different manner from each other based on the seat position information. The controller 212 may limit service accessibility to a vehicle with the plurality of mobile communication terminals 100A-100D within the vehicle and vehicle control related authority setting.

An information providing method according to an embodiment of the present disclosure may be carried out by any one of the first through the fourth mobile communication terminal 100A-100D.

The controller 212 may detect the user information of a plurality of mobile communication terminals 100A-100D based on an email, a user account (for example, Google-Gmail Account, etc.) and a setting menu provided according to a platform of the plurality of mobile communication terminals 100A-100D within a vehicle.

The controller 212 may detect each user age group of the plurality of mobile communication terminals 100A-100D based on the user information of the plurality of mobile communication terminals 100A-100D, and provide only a predetermined service according to the detected user age group. For example, the controller 212 may activate only application programs associated with predetermined music, videos, and the like when the user age group of a user of the fourth mobile communication terminal 100D among the plurality of mobile communication terminals 100A-100D is a minor, and activate application programs for controlling predetermined messages, music, videos, and a heating, ventilation, and air conditioning (HVAC) system when the user age group of a user of the second mobile communication terminal 100B among the plurality of mobile communication terminals 100A-100D is an adult.

When the user age group of a user of the third mobile communication terminal 100C among the plurality of mobile communication terminals 100A-100D is a minor, the controller 212 may display information (for example, a kid mode 8-3a indicating a minor on information 8-3 indicating the activated or deactivated application program.

The controller 212 may detect and analyze the resource and service status information of the plurality of mobile communication terminals 100A-100D, thereby allowing a service and information providing subject to be dynamically set. The resource and service status information may include Wi-Fi information, Bluetooth information, Network information, Battery information, Sensors information, Control information, Voice Recognition, "onForeGround", "onBackGround", "onStop" and the like, and may further include additional hardware information and additional service status information. The information on Wi-Fi may include whether or not to support "Wi-Fi Access Point (AP) Mode", "Wi-Fi Signal Strength", "Wi-Fi Connectivity Status" (for example, AP Enabled, AP Disabled, Wi-Fi Enabled, Wi-Fi disabled, etc.), and may further include additional information.

The controller 212 may detect a mobile communication terminal with "Wi-Fi AP Mode Support" or with the highest Wi-Fi signal based on the information on Wi-Fi, and establish a network environment within the vehicle such that the mobile communication terminal with the highest Wi-Fi signal is operated in an "Access Point (AP) Mode" within the vehicle.

The network information may include a network type (for example, a first network (LTE), a second network (3G), a third network (2G), etc.), network data limit and network data usage, and may further include additional information and service status information. The network information has a priority order of the first network, the second network and the third network according to the network type.

The controller 212 may detect each data usage and limit of the plurality of mobile communication terminals 100A-100D, and change a tethering support mobile terminal based on the detected data usage and limit.

The Bluetooth information may include Bluetooth connectivity information (for example, STATE_ON, STATE OFF, STATE_CONNECTED, STATE_CONNECTING, STATE_DISCONNECTED, STATE_DISCONNECTING, SCAN_MODE_NONE, SCAN_MODE_CONNECTABLE, SCAN_MODE_CONNECTABLE_DISCOVERABLE), and may further include additional information and service status information.

The battery information may include a remaining battery level, and a charging rate, and may further include additional information and service status information.

The controller 212 may detect a specific mobile communication terminal with the highest battery consumption among the plurality of mobile communication terminals 100A-100D based on the battery information, and determine the detected specific mobile communication terminal as a service subject for providing a service with the highest battery consumption, and change the service subject to a mobile communication terminal with the lowest battery consumption among the plurality of mobile communication terminals 100A-100D.

The controller 212 may automatically connect a mobile communication terminal with a current battery amount above a reference value among the plurality of mobile communication terminals 100A-100D.

The sensor information may include information on a gyro sensor, an acceleration sensor, a position & rotation sensor and a GPS sensor, and may further include additional information and service status information.

The controller 212 may set a different GPS information providing subject for each vehicle driving location and region (for example, tunnel, etc.) based on the sensor information.

The control information may include gesture recognition, specific user interfaces (for example, knob key control information, etc.), and may further include additional information and service status information.

The controller 212 may detect a mobile communication ten final supporting a vehicle-specific user interface based on the control information, and set the detected mobile communication terminal to an apparatus (information providing subject) capable of using gesture recognition and user interfaces, and the like.

The voice recognition information may include "speech to text" (STT) and "text to speech" (TTS), and may further include additional information and service status information.

The controller 212 may set any one of the plurality of mobile communication terminals 100A-100D to a subject of providing the STT and TTS based on the voice recognition information and Bluetooth information.

The controller 212 may set a subject of processing event information and notification (for example, INFORM, WARNING, EMERGENCY, etc.) generated when a second mobile communication terminal of the plurality of mobile communication terminals 100A-100D is set to a subject to a third mobile communication terminal of the plurality of mobile communication terminals 100A-100D.

FIG. 9 is an exemplary view illustrating a menu for activating or deactivating the application programs of a plurality of mobile communication terminals according to the embodiments of the present disclosure.

As illustrated in FIG. 9, the controller 212 displays a menu for activating or deactivating the application programs of a plurality of mobile communication terminals on the display unit 201 according to a user's request. The menu may include a first application program list of the first mobile terminal (driver's terminal) 100A; a second application program list of the second mobile terminal (passenger seat occupant's terminal) 100B; a third application program list of the third mobile terminal (back seat occupant's terminal) 100C, and the like; and check boxes for selecting application programs within the first through the third application program list.

For example, when a check box corresponding to a first application program within the first application program list is checked, the controller 212 activates or deactivates the first application program of the first mobile terminal (driver's terminal) 100A. When a check box corresponding to a second application program within the second application program list is checked, the controller 212 activates or deactivates the second application program of the second mobile terminal 100B. When a check box corresponding to a third application program within the third application program list is checked, the controller 212 activates or deactivates the third application program of the third mobile terminal 100C.

The controller 212 may activate or deactivate the application programs of the plurality of mobile communication terminals based on the driver's basic preference information.

Figure 10:
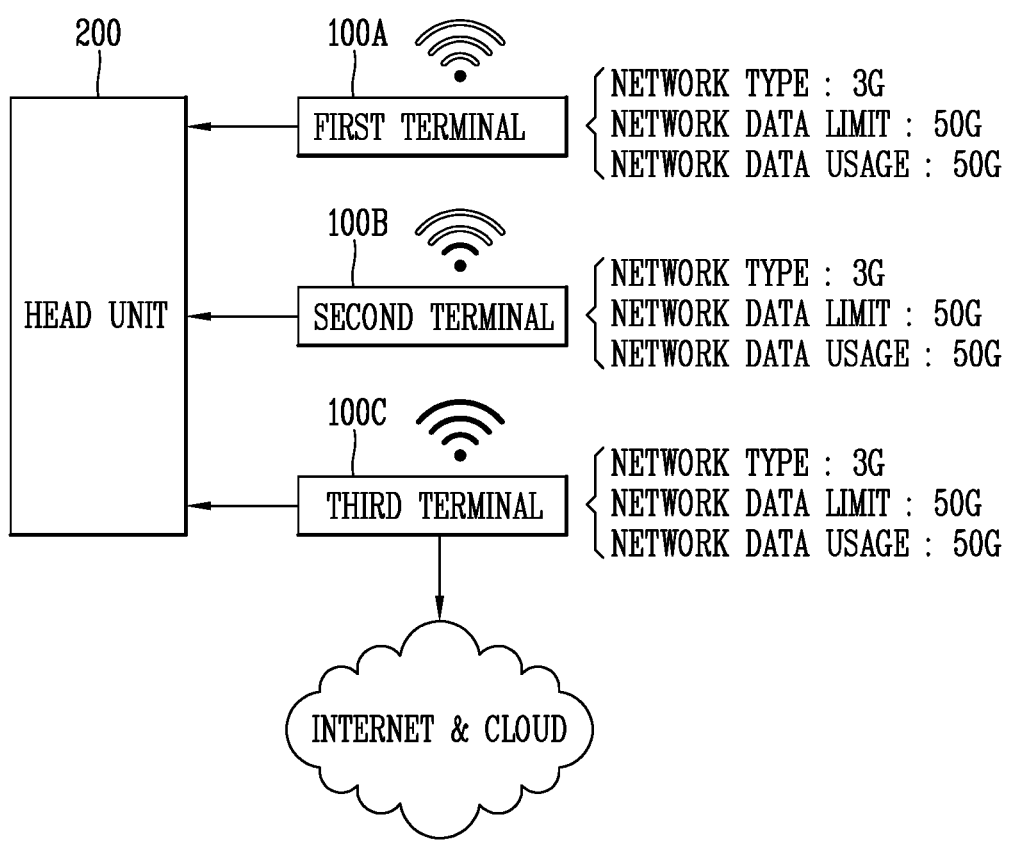
FIG. 10 is an exemplary view illustrating an access point (AP) (or tethering support mobile terminal) connected to a telematics terminal (or head unit) according to an embodiment of the present disclosure.

FIG. 10 is an exemplary view illustrating an access point (AP) (or tethering support mobile terminal) connected to a telematics terminal (or head unit) 200 according to an embodiment of the present disclosure. The access point (AP) may be any one of the first through the fourth mobile communication terminal 100A-100D.

As illustrated in FIG. 10, the controller 212 sets any one of the first through the fourth mobile communication terminal 100A-100D to a tethering terminal based on the network type and/or network signal intensity of the first through the fourth mobile communication terminal 100A-100D. For example, the controller 212 sets a mobile communication terminal with the fastest data speed network type and the highest network signal intensity among the first through the fourth mobile communication terminal 100A-100D to a tethering terminal.

When the network signal intensity of the set tethering terminal is less than a reference value, the controller 212 detects a mobile communication terminal with the fastest data speed network type and the highest network signal intensity again among the first through the fourth mobile communication terminal 100A-100D, and changes the detected mobile communication terminal to a tethering terminal.

The controller 212 sets any one of the first through the fourth mobile communication terminal 100A-100D to a tethering terminal based on the network data usage and/or network signal intensity of the first through the fourth mobile communication terminal 100A-100D. For example, the controller 212 sets a mobile communication terminal with a predetermined level of the network data usage less than a network data limit as well as the highest network signal intensity among the first through the fourth mobile communication terminal 100A-100D to a tethering terminal.

The controller 212 may detect the network type and/or network signal intensity of the first through the fourth mobile communication terminal 100A-100D or the network data usage and/or network signal intensity of the first through the fourth mobile communication terminal 100A-100D according to the movement of the vehicle, periodically or in real time, to change the tethering terminal according to the detection result.

The controller 212 may detect the network type, network signal intensity and network data usage of the first through the fourth mobile communication terminal 100A-100D according to the movement of the vehicle, periodically or in real time, to change the tethering terminal according to the detection result.

Figure 11A:
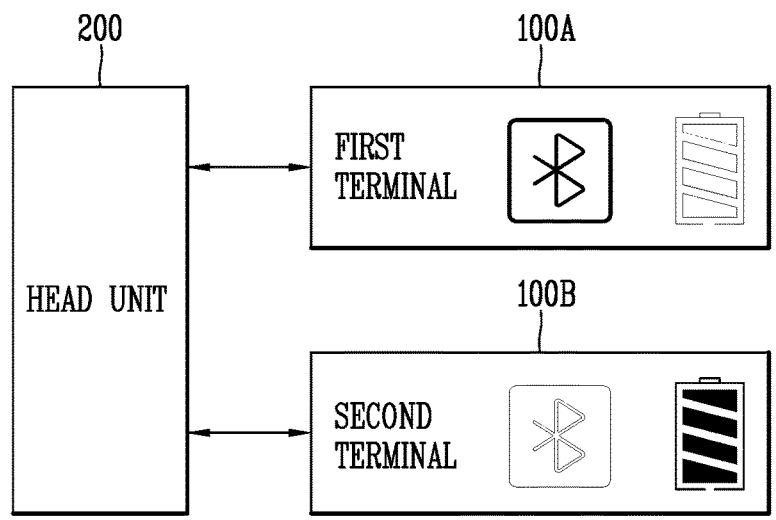
FIGS. 11A and 11B are exemplary views illustrating a mobile communication terminal paired with a telematics terminal (or head unit) according to an embodiment of the present disclosure.
Figure 11B:
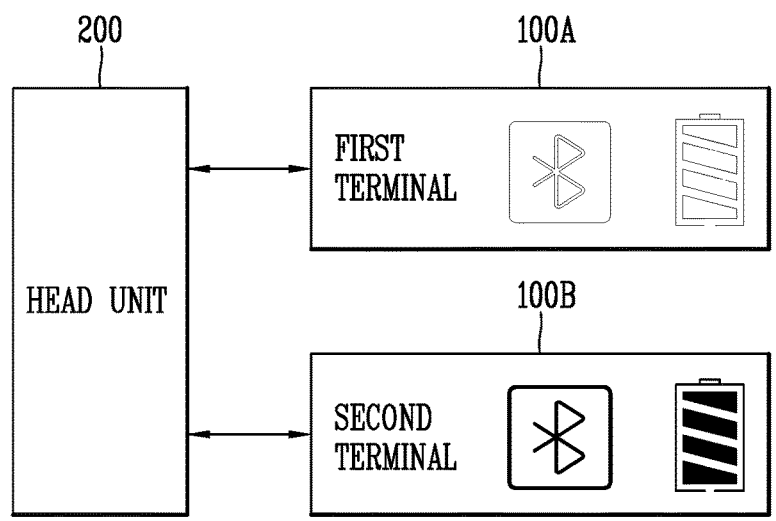

FIGS. 11A and 11B are exemplary views illustrating a mobile communication terminal paired with a telematics terminal (or head unit) 200 according to an embodiment of the present disclosure.

As illustrated in FIGS. 11A and 11B, the controller 212 may be connected to (paired with) any one or more of the first through the fourth mobile communication terminal 100A-100D through a Bluetooth network. For example, the controller 212 may be connected to the first mobile communication terminal 100A among the first through the fourth mobile communication terminal 100A-100D through a Bluetooth network to use the information (for example, application programs, content, data, etc.) of the first mobile communication terminal 100A through the Bluetooth network.

The controller 212 may detect the current battery remaining amounts of the second through the fourth mobile communication terminal 100B-100D as well as the battery remaining amount of the first mobile communication terminal 100A, periodically or in real time, and maintains a Bluetooth network connection to the first mobile communication terminal 100A when the battery remaining amount of the first mobile communication terminal 100A is above a reference value.

When the battery remaining amount of the first mobile communication terminal 100A is less than the reference value, the controller 212 blocks a Bluetooth network to the first mobile communication terminal 100A, and connects a mobile communication terminal (for example, second mobile communication terminal) with a current battery remaining amount above the reference value among the second through the fourth mobile communication terminal 100B-100D to use the information (for example, application programs, content, data, etc.) of the second mobile communication terminal 100B through the Bluetooth network.

When the battery remaining amount of the first mobile communication terminal 100A is less than the reference value, the controller 212 is unable to use or provide a service of the vehicle, and thus displays a notification popup window indicating that the battery remaining amount of the first mobile communication terminal 100A is less than the reference value on the display unit 201, and forms a new Bluetooth connection based on a currently paired mobile communication terminal list.

The controller 212 may dynamically set a data providing subject required for driving route searches and location services based on the sensor information (for example, a gyro sensor, an acceleration sensor, a position & rotation sensor and a GPS sensor. For example, when a vehicle moves on a section (for example, tunnel) with insufficient reception of GPS signals, the controller 212 may use the relevant information or continuously use necessary services based on one or more sensor information among the first through the fourth mobile communication terminal 100A-100D.

When a plurality of mobile communication terminals are connected to the telematics terminal (or head unit) 200, the controller 212 may compare and analyze information different from each other on the plurality of mobile communication terminals to dynamically set an information provider.

Figure 12:
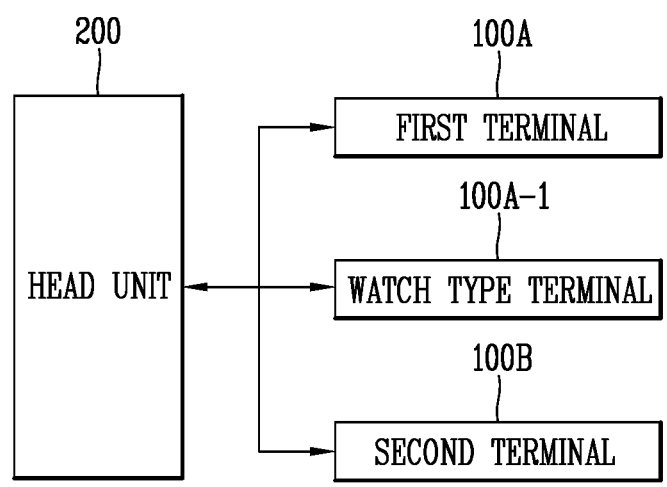
FIG. 12 is another exemplary view illustrating a mobile communication terminal paired with a telematics terminal (or head unit) according to an embodiment of the present disclosure.

FIG. 12 is a view illustrating a method of dynamically setting a voice recognition providing subject according to the battery remaining amount (consumption amount), as another exemplary view illustrating a mobile communication terminal paired with a telematics terminal (or head unit) 200 according to an embodiment of the present disclosure.

As illustrated in FIG. 12, the controller 212 may use a voice recognition function through the first mobile communication terminal (driver's mobile phone) 100A. For example, the controller 212 connects the first mobile communication terminal (driver's mobile phone) 100A through a Bluetooth network, and the first mobile communication terminal (driver's mobile phone) 100A recognizes a voice entered through the microphone of the first mobile communication terminal 100A, and outputs the recognized voice to the controller 212 through the Bluetooth network. The first mobile communication terminal 100A may perform a navigation function and/or a media streaming function, and provide the execution result to the controller 212.

The controller 212 detects the battery remaining amount of the first mobile communication terminal (driver's mobile phone) 100A, and selects a mobile communication terminal with a battery remaining amount above the reference value among mobile communication terminals 100A-1, 100B paired with the telematics terminal (or head unit) 200 when the battery remaining amount is less than a reference value, and connects the selected mobile communication terminal (voice recognition function providing subject) through the Bluetooth network, and performs the voice recognition function through the connected mobile communication terminal 100A-1 or receives a result based on the execution of the navigation function and/or media streaming function. The mobile communication terminal 100A-1 may be a watch type mobile terminal mounted on a user's wrist.

As described above in detail, an information providing apparatus and a method thereof according to the embodiments of the present disclosure may easily, quickly and intuitively check connection status information (location information and identification information) between a plurality of mobile terminals within a vehicle.

An information providing apparatus and a method thereof according to the embodiments of the present disclosure may easily and quickly use information on a plurality of mobile terminals within a vehicle.

An information providing apparatus and a method thereof according to the embodiments of the present disclosure may link with a plurality of terminals within a vehicle, and easily and quickly receiving users' desired application programs from the plurality of terminals to easily and effectively use information (for example, application programs, content, data, etc.) stored in the plurality of terminals, respectively.

It will be apparent to those skilled in this art that various changes and modifications may be made thereto without departing from the gist of the present invention. Accordingly, it should be noted that the embodiments disclosed in the present invention are only illustrative and not limitative to the concept of the present invention, and the scope of the concept of the invention is not limited by those embodiments. The scope protected by the present invention should be construed by the accompanying claims, and all the concepts within the equivalent scope of the invention should be construed to be included in the scope of the right of the present invention.

What is claimed is:

1. An information providing apparatus, comprising:
   a communication unit to form a communication network with at least one of a plurality of mobile terminals within a vehicle;
   a display; and
   a controller to:
   receive seat position information of the at least one of the plurality of mobile terminals through the communication network,
   activate or deactivate application programs for the at least one of the plurality of mobile terminals based on the seat position information, and
   display information indicating the activated or deactivated application programs of the at least one of the plurality of mobile terminals on the display.

2. The information providing apparatus of claim 1, wherein the controller further:
   displays a vehicle image corresponding to the vehicle on the display unit, and
   displays the information indicating the activated or deactivated application programs on the vehicle image.

3. The information providing apparatus of claim 1, wherein the controller further:
   displays a vehicle image corresponding to the vehicle or an image corresponding to the at least one of the plurality of mobile terminals on the display unit, and
   in response to connecting to the at least one of the plurality of mobile terminals, changes a color or shape of the image corresponding to the at least one of the plurality of mobile terminals or the vehicle image.

4. The information providing apparatus of claim 1, wherein the controller further:
   displays a image corresponding to the at least one of the plurality of mobile terminals at a location corresponding to the seat position information on the vehicle image, and
   displays the information indicating the activated or deactivated application programs on the image corresponding to the at least one of the plurality of mobile terminals.

5. The information providing apparatus of claim 4, wherein the controller further:
   generates the location corresponding to the seat position information based on information received via a near field communication (NFC), radio-frequency identification (RFID), a beacon, Bluetooth, Universal Serial Bus (USB) or a user input.

6. The information providing apparatus of claim 1, wherein the controller further:
    detects a user age group corresponding to the at least one of the plurality of mobile terminals, and
    activates or deactivates the application programs of the at least one of the plurality of mobile terminals according to the detected user age group.

7. The information providing apparatus of claim 6, wherein the controller further:
    displays information indicating the user age group on the information indicating the activated or deactivated application programs.

8. The information providing apparatus of claim 1, wherein the controller further:
    receives a user input including a long touch, and
    activates or deactivates the application programs of the at least one of the plurality of mobile terminals according the long touch.

9. The information providing apparatus of claim 1, wherein the controller further:
    displays a menu for activating or deactivating the application programs of the at least one of the plurality of mobile terminals, and
    activates or deactivates application programs selected among the application programs contained in the menu.

10. The information providing apparatus of claim 9, wherein the menu comprises:
    a first application program list of a first mobile terminal within the vehicle;
    a second application program list of a second mobile terminal within the vehicle; and
    check boxes for selecting application programs within the first and the second application program list.

11. The information providing apparatus of claim 1, wherein the controller further:
    activates or deactivates the application programs of the at least one of the plurality of mobile terminals based on user preference information.

12. The information providing apparatus of claim 1, wherein the controller further:
    sets any one of the plurality of mobile terminals to a tethering terminal based on any one or more of network types, network data usages and network signal intensities of the plurality of mobile terminals.

13. The information providing apparatus of claim 1, wherein the controller further:
    detects the network types, network data usages and network signal intensities of the plurality of mobile terminals in real time or periodically, and
    sets any one of the plurality of mobile terminals to a tethering terminal according to the detected result.

14. The information providing apparatus of claim 1, wherein the controller further:
    detects a battery remaining amount of the at least one of the plurality of mobile terminals, and
    forms or blocks any one or more communication networks with the at least one of the plurality of mobile terminals based on the detected remaining amounts of the batteries.

15. The information providing apparatus of claim 1, wherein the controller further:
    detects a battery remaining amount of the at least one of the plurality of mobile terminals, and
    sets any one of the at least one of the plurality of mobile terminals to an information providing subject based on the detected remaining amounts of the batteries.

16. The information providing apparatus of claim 1, wherein the controller further:
    detects battery remaining amounts of the plurality of mobile terminals, and
    sets one of the plurality of mobile terminals to provide a voice recognition function based on a detected battery remaining amounts.

17. The information providing apparatus of claim 1, wherein the at least one of the plurality of mobile terminals is a telematics terminal mounted in the vehicle, a rear seat entertainment system (RSE) or a navigation apparatus.

18. The information providing apparatus of claim 1, wherein the controller and the plurality of mobile terminals exchange information with each other.

19. An information providing method, the method comprising:
    forming a communication network with at least one of a plurality of mobile terminals within a vehicle;
    receiving seat position information of the at least one of the plurality of mobile terminals through the communication network;
    activating or deactivating application programs for the at least one of the plurality of mobile terminals based on the seat position information; and
    displaying information indicating the activated or deactivated application programs of the at least one of the plurality of mobile terminals on a display.

20. The method of claim 19, wherein said displaying the information comprises:
    displaying a vehicle image corresponding to the vehicle on the display; and
    displaying the information indicating the activated or deactivated application programs on the vehicle image.

* * * * *